(12) United States Patent
Seeling et al.

(10) Patent No.: US 7,867,614 B2
(45) Date of Patent: Jan. 11, 2011

(54) METHOD FOR PRODUCING NANOCOMPOSITE ADDITIVES WITH IMPROVED DELAMINATION IN POLYMERS

(75) Inventors: Rainer Seeling, Elsdorf-Grouven (DE); Heinz-Dieter Metzemacher, Cologne (DE); Norbert Schall, Forstern (DE); Günther Lübbe, Altdorf (DE)

(73) Assignee: Rockwood Clay Additives, GmbH, Moosburg (DE)

( * ) Notice: Subject to any disclaimer, the term of this patent is extended or adjusted under 35 U.S.C. 154(b) by 831 days.

(21) Appl. No.: 10/557,724

(22) PCT Filed: Jun. 14, 2004

(86) PCT No.: PCT/EP2004/006397

§ 371 (c)(1),
(2), (4) Date: Nov. 16, 2005

(87) PCT Pub. No.: WO2004/111122

PCT Pub. Date: Dec. 23, 2004

(65) Prior Publication Data

US 2007/0072980 A1    Mar. 29, 2007

(30) Foreign Application Priority Data

Jun. 12, 2003  (DE) ............... 103 26 977

(51) Int. Cl.
*B32B 19/00*  (2006.01)
*C08K 9/04*  (2006.01)

(52) U.S. Cl. ............ 428/405; 428/403; 427/220; 523/200; 523/212; 524/445

(58) Field of Classification Search ............... 524/445, 524/446, 447; 523/200, 212; 428/403, 405; 427/220

See application file for complete search history.

(56) References Cited

U.S. PATENT DOCUMENTS

| | | | |
|---|---|---|---|
| 1,756,236 A | * | 4/1930 | Beers .................. 241/97 |
| 3,576,388 A | | 4/1971 | Burns |
| 4,255,318 A | | 3/1981 | Kaide et al. |

(Continued)

FOREIGN PATENT DOCUMENTS

EP    0 627 480    12/1994

(Continued)

OTHER PUBLICATIONS

Giannelis "Flame Retardant Nanocomposite Materials", Annual Conference on Fire Research NISTIR 6242, Nov. 2-5, 1998, pp. 39-40.

(Continued)

*Primary Examiner*—Vickey Nerangis
(74) *Attorney, Agent, or Firm*—Meyertons, Hood, Kivlin, Kowert & Goetzel, P.C.; Eric B. Meyertons (57) ABSTRACT

A process for modification, in particular for surface modification of an organophilic clay material, encompassing the following steps:
 a) provision of a dry, pulverulent, organophilic clay material (component a);
 b) provision of at least one additive (component b) for modification of component a);
 c) intensive mixing of components a) and b) in a high-shear mixing assembly,
where no water or solvent is added or used for addition of component b).

40 Claims, 3 Drawing Sheets

U.S. PATENT DOCUMENTS

| | | | |
|---|---|---|---|
| 4,391,637 A | 7/1983 | Mardis et al. | |
| 4,402,881 A | 9/1983 | Alther | |
| 4,410,364 A | 10/1983 | Finlayson et al. | |
| 4,412,018 A | 10/1983 | Finlayson et al. | |
| 4,434,075 A | 2/1984 | Mardis et al. | |
| 4,434,076 A | 2/1984 | Mardis et al. | |
| 4,472,538 A | 9/1984 | Kamigaito et al. | |
| 4,474,706 A | 10/1984 | Clay | |
| 4,517,112 A | 5/1985 | Mardis et al. | |
| 4,546,126 A | 10/1985 | Breitenfellner et al. | |
| 4,558,075 A | 12/1985 | Suss et al. | |
| 4,582,866 A | 4/1986 | Shain | |
| 4,664,820 A | 5/1987 | Magauran et al. | |
| 4,695,402 A | 9/1987 | Finlayson | |
| 4,739,007 A | 4/1988 | Okada et al. | |
| 4,777,206 A | 10/1988 | Rittler | |
| 4,826,899 A | 5/1989 | Rees | |
| 4,866,018 A | 9/1989 | Elliot | |
| 4,874,728 A | 10/1989 | Elliott | |
| 4,891,392 A * | 1/1990 | Abe et al. | 523/200 |
| 5,017,637 A | 5/1991 | Smith et al. | |
| 5,091,462 A | 2/1992 | Fukui et al. | |
| 5,132,350 A | 7/1992 | Keogh | |
| 5,139,875 A | 8/1992 | Metzemacher et al. | |
| 5,164,460 A | 11/1992 | Yano et al. | |
| 5,236,985 A | 8/1993 | Hayami | |
| 5,429,999 A | 7/1995 | Nae | |
| 5,554,670 A | 9/1996 | Giannelis et al. | |
| 5,747,560 A | 5/1998 | Christiani et al. | |
| 5,773,502 A | 6/1998 | Takekoshi et al. | |
| 5,780,376 A | 7/1998 | Gonzales et al. | |
| 5,827,906 A * | 10/1998 | Metzemacher et al. | 523/205 |
| 5,936,023 A * | 8/1999 | Kato et al. | 524/445 |
| 5,973,053 A * | 10/1999 | Usuki et al. | 524/445 |
| 6,034,163 A | 3/2000 | Barbee et al. | |
| 6,084,008 A | 7/2000 | Liu | |
| 6,103,805 A | 8/2000 | Kojima et al. | |
| 6,139,962 A | 10/2000 | Herget et al. | |
| 6,380,295 B1 | 4/2002 | Ross et al. | |
| 6,414,070 B1 | 7/2002 | Kausch et al. | |
| 6,451,895 B1 | 9/2002 | Topolkaraev et al. | |
| 6,492,453 B1 | 12/2002 | Ebrahimian et al. | |
| 6,521,690 B1 | 2/2003 | Ross et al. | |
| 6,583,209 B2 | 6/2003 | Mehta et al. | |
| 6,598,645 B1 * | 7/2003 | Larson | 152/548 |
| 6,605,655 B1 | 8/2003 | Kato et al. | |
| 6,610,770 B1 | 8/2003 | Ross et al. | |
| 6,632,868 B2 | 10/2003 | Qian et al. | |
| 6,649,713 B2 | 11/2003 | Tang et al. | |
| 6,683,122 B1 | 1/2004 | Zilg et al. | |
| 6,750,282 B1 | 6/2004 | Schall | |
| 6,759,464 B2 | 7/2004 | Ajbani et al. | |
| 6,794,437 B2 | 9/2004 | Ross et al. | |
| 6,802,784 B2 | 10/2004 | Sullivan et al. | |
| 6,822,035 B2 | 11/2004 | Chaiko | |
| 6,828,371 B2 | 12/2004 | Lee et al. | |
| 6,849,680 B2 | 2/2005 | Knudson et al. | |
| 6,911,488 B2 | 6/2005 | Cody et al. | |
| 7,135,508 B2 * | 11/2006 | Chaiko et al. | 523/216 |
| 7,208,546 B2 | 4/2007 | Rajagopalan et al. | |
| 7,312,258 B2 * | 12/2007 | Hoppler et al. | 523/212 |
| 2006/0155018 A1 * | 7/2006 | Metzemacher et al. | 524/127 |
| 2006/0155035 A1 * | 7/2006 | Metzemacher et al. | 524/445 |
| 2007/0072980 A1 | 3/2007 | Rainer et al. | |

FOREIGN PATENT DOCUMENTS

| | | | |
|---|---|---|---|
| FR | 2819518 | * | 7/2002 |
| GB | 1118723 | | 7/1968 |
| JP | 55112248 | | 8/1980 |
| JP | 62181144 | | 8/1987 |
| JP | 63030588 | | 2/1988 |
| JP | 63260957 | | 10/1988 |
| JP | 63273693 | | 11/1988 |
| JP | 995630 | | 4/1997 |
| JP | 10139998 | | 5/1998 |
| JP | 10204298 | | 8/1998 |
| JP | 11228748 | | 8/1999 |
| WO | WO 97/31873 | | 9/1997 |
| WO | 0066657 | | 11/2000 |
| WO | 0078540 | | 12/2000 |
| WO | 0140369 | | 6/2001 |
| WO | 02100936 | | 12/2002 |

OTHER PUBLICATIONS

Miller, ed. "Tiny Clay Particles pack potent properties punch" Plastics World, Oct. 1997, pp. 36-38.

Liu, Y. et al., "Preparation of polypropylene/polystyrene/montmorillonite nano-composites", China Plastics, vol. 16, No. 2, Feb. 2002.

Kyaowa Chemical Industry Co., Ltd. Product "Additives for Resins", 1997, 2 pages.

Gilman et al. "Nanocomposites: A Revolutionary New Flame Retardant Approach," SAMPLE Journal, vol. 33 No. 4, 1997, pp. 40-46.

Gilman et al. "Flammability and Thermal Stability Studies of Polymer Layered -Silicate (Clay) Nanocomposites-II" Flame Retardancy, 10th Annual BCC Conference, May 24-26, 1999, pp. 1-11.

Notice of Opposition to EP Patent No. 1560879 filed Mar. 7, 2007 17 pages.

Notice to of Opposition to EP Patent No. 1177252, filed Mar. 15, 2006, 11 pages.

Notice to of Opposition to EP Patent No. 1177252, filed Feb. 24, 2006, 6 pages.

Observations by Third Party to EP Patent Application No. 00910805 filed Sep. 9, 2004, 8 pages.

Laus, M. et al. "New hybrid Nanocomposites based on an organophilic clay and polystyrene-butadiene) copolymers", Journal of Materials Research, Nov. 1997, vol. 12, pp. 3134-3139.

* cited by examiner

METHOD FOR PRODUCING NANOCOMPOSITE ADDITIVES WITH IMPROVED DELAMINATION IN POLYMERS

The invention relates to a process for modification, in particular for surface modification of an organophilic clay material, to a modified organophilic clay material which can be obtained by the inventive process, to a polymer composition which comprises the modified organophilic clay material, to the use of the modified organophilic clay material, to pre-exfoliated nanocomposite additives, and also to a nanocomposite composition.

The properties of plastics or of polymeric materials generally can be improved via addition of nanocomposite additives. These permit modification of mechanical properties or of gas permeation. Addition of nanocomposite additives can also, by way of example, improve flame retardancy properties. A stable crust layer forms during combustion of the polymer and suppresses further ignition of the polymer.

Nanocomposite additives are composed of naturally occurring or synthetic phyllosilicates whose surfaces have been modified via organic molecules. The organic modification matches the surface polarity of the nanocomposite additives to the polarity of the polymers into which the nanocomposite additives are incorporated.

An example of a preparation method for nanocomposite additives disperses and delaminates a swellable phyllosilicate, e.g. montmorillonite or hectorite, in water. An example of an organic modification method is addition of quaternary ammonium compounds, which become bonded via cation exchange to the negatively charged surface layers of the silicate lamellae. The polarity of the organically modified phyllosilicate can be influenced via the polarity of the organic component, and can thus be matched to the polarity of the plastics used. There are two possible routes for incorporation of the nanocomposite additives into polymers:

a) In-Situ Polymerization

In the case of in-situ polymerization, the nanocomposite additive is dispersed in a monomer, whereupon the layers of the phyllosilicate become delaminated. The monomer can also penetrate within the intervening space between adjacent silicate layers and act there to increase layer separation. During the subsequent polymerization process, the monomers which have penetrated into the intervening spaces also polymerize, the result being that the silicate layers become separated from one another. Substantial delamination of the layers takes place in a subsequent dispersion step. In order to achieve maximum delamination, the nanocomposite additive has to be compatible in its surface properties not only with the monomer but also with the resulting polymer.

b) Melt Compounding

In the case of melt compounding, the pulverulent nanocomposite additive is dispersed in the polymer melt in an extruder. Given sufficient compatibility of the surface properties of the nanocomposite additive with the polymer, delamination of the organically modified phyllosilicate lamellae occurs before the extrusion process is complete.

Maximum delamination of the nanocomposite additive is a precondition for achieving the desired improvements in mechanical properties, in gas permeation, and in flame retardancy in the plastic.

The nanocomposite additives used hitherto as additives for plastics are composed of a phyllosilicate which has been modified by a cationic organic component and, if appropriate, by other components influencing the polarity of the phyllosilicate. To prepare the nanocomposite additive, the phyllosilicate is first dispersed in water and then the cationic organic component is added at a temperature of about 80° C. Once the cationic organic component has been added, the modified phyllosilicate is precipitated and is then isolated via filtration, dried, and ground. For example, U.S. Pat. No. 4,695,402 describes a process for preparation of organically modified bentonites. This process first stirs a slurry of the phyllosilicate under high-shear conditions and then adds an organic cation, its amount corresponding to about 90-150% of the cation exchange capacity of the phyllosilicate. The organically modified phyllosilicate is isolated from the slurry and then dried at a temperature below about 50° C., under non-aggressive conditions. Examples of organic cations which may be used are ammonium, phosphonium or sulfonium systems which bear long-chain linear or branched alkyl chains.

U.S. Pat. No. 5,429,999 prepares an organically modified phyllosilicate by first slurrying a phyllosilicate, such as montmorillonite, bentonite, or hectorite, in water. The slurry is heated to temperatures of about 70° C. and then two different organic cations are added in succession. Examples of organic cations which may be used are quaternary ammonium salts, phosphonium salts, sulfonium salts, and also mixtures of these. The amount added of the first organic cation to the slurry here corresponds to about 75-150% of the cation exchange capacity of the phyllosilicate. The amount added of the second organic cation corresponds to about 0.01-20% by weight, based on the total amount of the organic cation. One or more organic anions which can react with the first and/or second organic cation are then added in order to form a complex with the phyllosilicate. The first organic cation contains hydrophobic groups, while the second organic cation contains hydrophilic groups. The reaction product is then isolated via filtration and dried under mild conditions.

EP 0 627 480 A1 describes an organically modified phyllosilicate which is obtained by first preparing an aqueous slurry of a phyllosilicate. The slurry is heated to temperatures of about 70° C., and then an organic cation is added. The organophilic phyllosilicate may moreover comprise an organic anion, e.g. in the form of sodium stearate. The organic cation, and also the organic anion, is added to the aqueous slurry of the phyllosilicate. The reaction product is isolated via filtration and then dried under mild conditions.

U.S. Pat. No. 4,874,728 describes an organophilic phyllosilicate which is obtained by first adding a quaternary ammonium salt which bears long-chain alkyl groups to an aqueous slurry of a phyllosilicate. The reaction product is then isolated via filtration and dried.

U.S. Pat. No. 4,866,018 describes an organophilic phyllosilicate which is obtained by adding a quaternary ammonium compound to an aqueous slurry of a phyllosilicate and then adding an organic zirconium-aluminum complex. The reaction product is then isolated via filtration and dried.

By way of example, U.S. Pat. No. 4,474,706 describes the preparation of organophilic bentonites in the form of a dry mixing process avoiding pre-dispersion of the sodium bentonite in water. This process reacts a substantially dry, swellable clay with an organic ammonium compound without addition of water. For this, the clay and the ammonium compound are mixed at temperatures above the melting point of the ammonium compound. The components are mixed with one another until all liquid has been removed from the reaction mixture and an organically modified clay is obtained. The reaction of the ammonium compound with the clay can be discerned via the increase in the separation between adjacent layers of the clay. Mixtures of various ammonium compounds are preferably used for the modification process. The ammonium salts may be added to the dry clay individually or may be added in the form of a mixture in any desired sequence. The selected temperature at which the mixing of the components takes place has to be higher than the melting point of the highest-melting-point quaternary ammonium compound. The modified clay can then be washed with water and then redried and, if appropriate, ground. In order to achieve reaction between clay and ammonium salt, intensive mixing of the components is required. In the case of a laboratory-scale reaction this can be achieved, by way of example, via use of a pestle and mortar. In the case of an industrial-scale reaction, a ribbon blender may be used, or an extruder. During the mixing process, slight heating of the reaction mixture is observed, produced via compaction and friction.

DE 31 45 043 A1 describes a process for preparation of organophilic clays. A finely ground, dry raw clay is sprayed with a solution of an organic compound. An example of the organic compound is a quaternary ammonium salt which has been modified by long-chain organic groups. The sprayed clay is then repeatedly dry-compacted and then again comminuted by grinding in order to prepare an organophilic clay. For preparation of the organically modified clay in the examples, the clay specimen is first introduced into a mixer and sufficient water is added to adjust the moisture content of the clay to 12% by weight. The required amount of the quaternary ammonium salt dissolved in water is then added, and the mixture is thoroughly mixed. After the mixing process, the specimen is passed through a two-roll system in which the reaction mixture is compacted under high pressure. The resultant compacted organophilic clay needs no further drying, but is merely comminuted and sieved to give the desired grain size.

WO 97/31873 describes a process for preparation of an organically modified clay which was prepared by a dry process and which can be introduced directly in the form of additive. For this, the clay is treated with a mixture of a quaternary ammonium salt and an aprotic polar solvent selected from propylene carbonate, ethylene carbonate, N,N-dimethylformamide, N,N-di-methylacetamide, and dimethyl sulfoxide. The reaction is usually carried out at room temperature or at elevated temperatures, and the reaction mixture here is mixed until the polar aprotic solvent can react with the clay particles. The mixing process can use conventional mixers or extruders which provide shear action sufficient to bring about reaction of the clay with the organic materials. After the reaction, the product obtained can then, if appropriate, be dried and ground.

If the nanocomposite additives are to be capable of industrial use, they have to be exfoliated in the polymer. During this exfoliation process, the initial close-range order within the phyllosilicates is lost. The phyllosilicates are split open to give individual lamellae which then encompass only single silicate layers. Completely exfoliated smectites may form lamellar particles which have a very high aspect ratio of up to 1000. These particles are lamellae with thickness in the region of about 1 nm, width of about 100 nm, and length in the region of from about 500 to 1000 nm. When the nanocomposite additives are incorporated into a plastics matrix, in the case of some polymers although an increase in the layer separation is observed, i.e. the polymer becomes to some extent intercalated into intermediate spaces between adjacent lamellae of the phyllosilicate, no complete exfoliation of the nanocomposite additive takes place in the polymer. Relatively large particles remain present within the polymer, these being formed from agglomerates of the lamellae described above. This has a disadvantageous effect on mechanical properties and on the extrudability of the polymer compositions. Uniform dispersion of the nanocomposite additives in the polymer composition is moreover difficult.

The object underlying the present invention was therefore to provide a process for preparation of organically modified phyllosilicates which exhibit improved delamination during incorporation into plastics, i.e. in which almost complete exfoliation takes place during incorporation into a polymer material.

This object is achieved by a process with the features of claim 1. Advantageous embodiments are provided by the dependent claims.

The inventive process for modification, in particular for surface modification of an organophilic clay material, encompasses the following steps:

a) provision of a dry, pulverulent, organophilic clay material (component a);
b) provision of at least one additive (component b) for modification of component a);
c) intensive mixing of components a) and b) in a high-shear mixing assembly, where no water or solvent is added or used for addition of component b).

The starting material for the inventive process is itself an organophilic clay material. Examples of organophilic clay materials which may be used are the organically modified nanocomposite additives previously known for use in polymer compositions. The inventive form of reaction of the organophilic clay material with the additive, with intensive mixing of organophilic clay material and additive in a high-shear mixing assembly, gives a modified organophilic clay material which can be exfoliated significantly more easily and more completely during incorporation into a polymer composition. The proportion of aggregates composed of two or more lamellae can be significantly reduced. This can be discerned, by way of example, on electron micrographs. Any desired method may per se be used to prepare the organophilic clay material. The organophilic clay material is preferably prepared by the general process described above, which first prepares an aqueous suspension of a raw clay and then reacts this with an organic modifier. Known processes may be used here, for example those described in the introduction.

Raw clays which may be used are conventional swellable phyllosilicates. These may have been obtained from natural sources or may have been prepared synthetically. Smectites are particularly suitable, examples being montmorillonite, hectorite, saponite, and beidellite. Bentonites can also be used. The raw clays are preferably used in their sodium form because swellability is better.

The organic modifier used may per se comprise any of the known modifiers. Cationic organic agents are particularly suitable, examples being ammonium compounds which bear at least one long carbon chain, for example a chain encompassing from 12 to 22 carbon atoms. The ammonium compound preferably encompasses two relatively long carbon chains. The carbon chains may be identical or different, and linear or branched. Examples of suitable carbon chains are lauryl, stearyl, tridecyl, myristyl, pentadecyl, and hexadecyl groups. Examples of relatively long branched carbon chains are the 12-methylstearyl or 12-ethylstearyl group. One particularly preferred carbon chain is the stearyl group. Relatively short carbon chains which may encompass from 1 to 22 carbon atoms preferably satisfy the other valencies of the nitrogen atom. Methyl groups particularly preferably satisfy the other valencies of the nitrogen atom. However, it is also possible for hydrogen atoms to satisfy the free valencies. The carbon chains bonded to the nitrogen atom may be saturated or unsaturated chains and may, for example, also encompass aromatic groups. For example, the ammonium compound may also bear benzyl groups alongside the long carbon chains. The ammonium compounds may be used in the form of chlorides, for example. Alongside the ammonium compounds, the analogous phosphonium and sulfonium compounds may also be used for preparation of the organophilic clay material. Organophilic clays modified by ammonium compounds are particularly preferred as starting material for the inventive process.

The organophilic clay material is modified with the aid of an additive. Examples of additives which may be used for modification of the organophilic clay material are the following compounds:

Fatty acids or fatty acid derivatives, preferably those selected from fatty acids having from 10 to 13 carbon atoms. Mention may be made here particularly of laurylic acid, palmitic acid, stearic acid, oleic acid, linoleic acid, caproic acid, and castor oil.

The fatty acid derivatives encompass, by way of example, hydrogenated derivatives, alcohol derivatives, amine derivatives, and mixtures of these. They may also have been selected from the group of the polymeric fatty acids, the keto fatty acids, the fatty acid alkyloxazolines and fatty acid alkylbisoxazolines, and mixtures of these. Among the unsaturated fatty acids, mention may particularly be made of the mono- or polyunsaturated hydroxy fatty acids.

It is also possible to use non-ionic, organic components which have at least one aliphatic or cyclic radical having from 6 to 32 carbon atoms, preferably from 8 to 22 carbon atoms, in particular from 10 to 18 carbon atoms. Particularly preferred non-anionic, organic components are fatty acid derivatives from one of the following classes of substance:

1. Fatty alcohols, saturated or unsaturated, including primary and also secondary alcohols, in particular having $C_6$-$C_{22}$ radicals;
2. Fatty aldehydes, fatty ketones;
3. Fatty alcohol polyglycol ethers;
4. Fatty amines;
5. Mono-, di-, and triglyceride esters;
6. Fatty acid alkanolamides;
7. Fatty acid amides;
8. Alkyl esters of fatty acids;
9. Fatty acid glucamides;
10. Dicarboxylic esters;
11. Waxes;
12. Water-insoluble fatty acid soaps (these being the salts of long-chain carboxylic acids with divalent metals);
13. Montan waxes (these being waxes whose chain length is $C_{26}$-$C_{32}$;
14. Paraffins and PE waxes.

Particular preference is given to fatty alcohols, fatty amides, triglyceride esters, alkyl esters of fatty acids, and waxes.

Siloxane components may also be used, and according to IUPAC guidelines these are oligomeric or polymeric siloxanes or siloxane derivatives. Preferred siloxane derivatives here are those in which at least one of the $CH_3$ side groups on the Si atom has been replaced by another functional group. Particular preference, without restriction, is given to oligoalkylsiloxanes, polydialkylarylsiloxanes, polydiarylsiloxanes, and mixtures of these, and particular preference is given to the siloxane derivatives mentioned which have been functionalized by at least one reactive group.

Organophilic clay and additive are mixed in the inventive process without addition of water or of any other solvent. The organophilic clay material preferably has very low moisture content or solvent content, the result being that no clumping can occur during the mixing process, or that no plastic deformation can be carried out, for example that required during the extrusion process. The moisture content or solvent content of the organophilic clay material is preferably less than 10% by weight, in particular less than 5% by weight. The additive is added without dilution. The additive can, if appropriate, be melted prior to addition.

The organophilic clay material is added in the form of a powder into the high-shear mixing assembly. For this, the organophilic clay material is ground to a very small grain size. The median particle size ($D_{50}$ value) is preferably below 50 μm, preferably below a $D_{50}$ value of 30 μm, in particular less than 8 μm. The bulk density of the organophilic clay material is preferably less than 300 g/l, particularly preferably being selected in the range from 150 to 250 g/l. Determination of $D_{50}$ value, and also of bulk density, is explained at a later stage below in the experimental section of the description.

The organophilic clay and the additive are mixed in a high-shear mixing assembly. A high-shear mixing assembly here is a mixer in which the components of the mixture are mixed with one another with a high level of shear action, without any associated substantial densification or compacting. During the mixing process, the mixture composed of organophilic clay material and additive therefore retains the form of a free-flowing powder. The product obtained immediately after the mixing process is therefore, in contrast to the previously known modification process, a powder which can, by way of example, be incorporated in polymer compositions. There is also no requirement for regrinding of the modified organophilic clay material.

During the mixing process, intensive fluidization of the components takes place, with introduction of a large amount of energy. At the same time, an increase in the temperature of the material in the mixer is observed during the intensive mixing process. At the start of the mixing procedure, the electrical current consumed by the mixer is approximately constant. Once the mixing procedure has proceeded further, the electrical current consumption of the mixer increases, as therefore also does the amount of energy introduced into the mixer. The powder starts to agglomerate. The bulk density of the powder also increases. The mixing procedure is preferably conducted in such a way that the large amount of energy introduced by virtue of the intensive mixing process brings the mixture composed of organophilic clay material and additive within a period of a few minutes, for example from 6 to 8 minutes, to a temperature at which the electrical current consumption of the mixer rises non-linearly. The mixing procedure is terminated only after an increased level of electrical current consumption has been observed at the mixer for some time once the ideal mixing time has been exceeded, the electrical current consumption increases significantly. This constitutes a criterion for terminating the mixing process.

It is assumed that the intensive mixing process at an elevated temperature constantly creates new surfaces on the organophilic clay material, these surfaces coming into contact with the additive. The outcome here is coating by the additive of the surface of the organophilic clay material. It is likely that the additive is to some extent incorporated into the intervening spaces between adjacent lamellae. The porosity of the organophilic clay material is altered, and the capillary forces are changed. This significantly improves the delaminatability of the modified organophilic clay material in polymers. Alongside improved delamination, improved flowability of the modified organophilic clay material is also observed, as is improved metering capability during the extrusion process.

The intensive mixing of organophilic clay material and additive is preferably carried out at an elevated temperature. As mentioned above, the large amount of energy introduced during the intensive mixing process heats the material in the mixer, and after an initial mixing period the energy consumption of the mixture is observed to be non-linear here.

It is preferable that energy is introduced into the material in the mixer not only via the mixer but also additionally via heating of the material in the mixer. For this, the material is the mixer is uniformly heated, for example with the aid of a heating jacket. By way of example, a linear heating profile may be selected for the heating process. The heating process is preferably continued until a non-linear rise in the energy consumption of the mixer indicates reaction between organophilic clay material and additive.

The selected temperature up to which the material in the mixer, formed from organophilic clay material and additive, is heated is preferably higher than the melting point of the at least one additive. If more than one additive is present in the material in the mixer, the selected temperature is above the melting point of the highest-melting-point additive.

The temperature of the material in the mixer is preferably raised during the intensive mixing process. As explained above, the temperature of the material in the mixer may first be raised with the aid of an additional heat supply, until the increased energy consumption of the mixer indicates reaction between organophilic clay material and additive. Raising of the temperature also preferably continues after this point in the mixing of organophilic clay material and additive has been reached. The temperature increase here can be the result of the energy introduced by the mixer or the result of external heat supply.

The temperature range in which the intensive mixing of organophilic clay material and additive is carried out is preferably from 20 to 200° C., in particular from 40 to 150° C.

As explained above, the bulk density of the organophilic clay material increases during the intensive mixing process. The increase in the bulk density achieved during the intensive mixing process is preferably at least 20%, preferably at least 40%, in particular 60%, particularly preferably 80%, more preferably at least 100%, based on the bulk density of the pulverulent, organophilic clay material used.

The components of the material in the mixer, organophilic clay material and additive, are mixed with one another with introduction of a large amount of energy. The amount of energy introduced can be determined via the energy consumption of the mixer, i.e. the electrical power consumed during the intensive mixing process, which is then calculated relative to the volume of the material in the mixer. The amount of energy introduced during the intensive mixing process is preferably at least 300 kW/m$^3$.

It is preferable that the intensive mixing process is carried out until the increase achieved in the amount of energy introduced, measured on the basis of the electrical current consumption of the high-shear mixing assembly, is at least 10%, preferably at least 20%.

As explained above, a non-linear increase in the amount of energy introduced into the mixing assembly is observed after an induction period. It is preferable that the increase in the amount of energy introduced at the end of the intensive mixing process described herein, measured on the basis of the electrical current consumption of the high-shear stirrer assembly, is in the range from 10 to 50%, in particular from 20 to 30%, the starting point being the electrical current consumption of the high-shear stirrer assembly at the start of the intensive mixing process.

In particular, the intensive mixing process is carried out at least until the electrical current consumption increases by at least 20% within a period of 1 minute.

The high-shear mixing assembly used is preferably additionally heated if the above increase in the electrical current consumption is not achieved after a total duration of about 5 min. of intensive mixing.

During the intensive mixing process, the organophilic clay material used retains the form of a power. By virtue of the intensive fluidization of the particles, the organophilic clay material is reacted with the additive and is coated. The intensity of the mixing procedure and its duration are selected here in such a way that the increase in the particle size, measured as $D_{50}$, is not more than 10% during the intensive mixing process. It is particularly preferable that the particle size, measured as $D_{50}$, does not increase, or indeed falls. The change in the particle size of the modified organophilic clay material is always calculated with respect to the initial particle size, measured as $D_{50}$, of the component a) used for the intensive mixing process. The particle size. $D_{50}$ of the modified organophilic clay material is preferably in the range from about 20 to 5 µm.

The bulk density of the organophilic clay material increases during the intensive mixing process. The mixing process is preferably terminated when the bulk density has increased by at most 200% when compared with the initial bulk density of component a). The intensive mixing process therefore increases the bulk density to not more than three times the bulk density of the untreated organophilic clay material. The bulk density of the modified organophilic clay material is preferably in the range from 400 to 550 g/l.

The additive is added without dilution to the organophilic clay material. In one embodiment of the inventive process, both component a) and component b) are used in powder form. The pulverulent fine-grain solids behave like a liquid during the mixing process. A vortex is formed, and the product is therefore vigorously moved in a horizontal and vertical direction. Intensive introduction of energy leads to a temperature increase in the material in the mixer extending to a non-linear increase in the electrical current consumption of the mixer, resulting in an increase in the bulk density of the powder. However, it is also possible to use additives which are liquid at room temperature. Addition of these to the organophilic clay material is preferably immediately followed by intensive mixing, so that the additive does not cause clumping of the organophilic clay material. The liquid additive is preferably added in the vicinity of a vortex developing during the fluidization of the organophilic clay material. The mixture composed of organic clay material and additive is agitated in the mixing assembly in such a way as to form a vortex at peripheral velocities of up to 200 m/s. A cone is observed to form in the middle of the mixing vessel during the mixing procedure, i.e. during the intensive mixing procedure the material in the mixer takes the form of a cone extending to the base of the mixing assembly.

Both prior to and after the modification process, the organophilic clay material takes the form of a powder in the inventive process. The resultant modified organophilic clay material is preferably further processed in the form in which it is produced after the intensive mixing process, and, by way of example, is incorporated into a polymer. It is preferable that no separate compacting or densifying step for further processing of the modified organic clay material is carried out after the mixing process.

In one particularly preferred embodiment, the mixture is cooled immediately after the intensive mixing process. For this, the modified organophilic clay material is preferably cooled to temperatures of less than about 40° C., in particular less than about 30° C., particularly preferably from about 20 to 40° C.

It is preferable that the material is cooled over a period which is from 1 to 3 times the duration of the preceding intensive mixing of step c) described herein.

The cooled modified organic clay material can then be removed from the mixing assembly and, by way of example, packed into suitable packs to await further processing.

It is preferable that the modified organophilic clay material is actively cooled by way of cooling of the mixture or of the high-shear mixing assembly used for the intensive mixing process.

The modified organophilic clay material is preferably cooled in a separate, coolable mixer.

During cooling, agitation of the mixture may continue, and in particular intensive mixing of the mixture may continue.

It is preferable that the high-shear mixing assembly used comprises a heating-cooling mixer or a combination of a heating mixer and a cooling mixer. The heating or cooling mixers may be temperature-controlled independently of one another, e.g. using water/steam or hot fluid or by electrical means/hot air/air cooling or water cooling.

For preparation of the modified organophilic clay material it is important that intensive fluidization of organophilic clay material and additive take place. This has to be considered when selecting the mixing assembly. It is preferable that the high-shear mixing assembly has been selected from the group consisting of:
  a) paddle mixers, e.g. plowshare mixers (Lödige high-speed mixer, Drais high-speed mixer, MTI turbine mixer) with what are known as single- or multiple-crown filaments;
  b) screw mixers, e.g. screw mixers which have an either co rotating or counter rotating twin-screw system, segmental-screw mixers, e.g. coaxial kneaders (BUSS Co-Kneader);
  c) fluid mixers, e.g. impeller mixers, mechanical or pneumatic fluid mixers, e.g. Thyssen, Henschel, Papenmeier, or MTI heating mixers, etc.

Another high-shear mixing assembly which may be used is a mechanical fluid mixer which uses the fluidized-bed principle.

For the intensive mixing process it is also possible to use high-shear mixing assemblies which have stirrer systems and preferably at least one deflector blade. The stirrer systems are preferably composed of stainless steel, in particular of martensitic steels, of RC40, and of steels of relatively high hardness. They are moreover preferably corrosion-resistant. An ideal method uses fluidizing blades inter alia protected by hard "Stellite K12" metal applied by welding at all relevant locations. The distance of the basal scraper from the base of the mixer is preferably adjusted to a minimal distance defined via the discharge material, and the other fluidizer blades and the horn element are arranged in such a way that the temperatures required can reliably be achieved using the fluidizing blades at a selected fill level of the high-speed mixer.

In order to give ideal assurance of the necessary fluidization, a minimum of 1, preferably 2 or more, deflector plates have been installed. The arrangement of these is such as to give ideal and thorough fluidization of the surface-modified organophilic clay material.

The modified organophilic clay material obtained by the inventive process exhibits improved delamination on incorporation into polymers. These modified organophilic clay materials moreover exhibit better flow behavior and permit easier metering during processing of plastics in an extruder.

The invention therefore also provides a modified organophilic clay material, in particular a surface-modified particulate, organophilic clay material, which is obtainable by the process described above. The inventive process increases the bulk density of the inventive modified organophilic clay material, and the median particle size is reduced. A particular characteristic of the inventive modified organophilic clay material is its improved delamination in polymers.

The inventive modified organophilic clay material performs well in incorporation into polymer materials, becoming almost completely delaminated (exfoliated). The inventive modified organophilic clay material can thus give these polymer materials advantageous properties, e.g. an increase in the flame retardancy or the scratch resistance of a polymer surface. The invention therefore also provides a polymer composition which comprises the inventive modified organophilic clay material.

The polymer in the polymer composition preferably comprises at least one polymer selected from the group consisting of polyethylene and copolymers of ethylene, e.g. HDPE (high density polyethylene), MDPE (medium density polyethylene), LLDPE, VLDPE, LDPE (low density polyethylene), ULDPE, ethylene-hexene copolymers, ethylene-octene copolymers, polyisobutylene, ethylene-propylene copolymers (EPM), terpolymers of ethylene-propylene-diene (EPDM), EBM (ethylene-butyl rubber), EPDM, ethylene-vinylsilane copolymers, ter- or copolymers of acrylic acid (EA), or ethylene with ethylene acrylate and acrylic acid (EAA) or methacrylic acid (EMA), EEA (ethylene-ethyl acrylate), EBA (ethylene-butyl acrylate), EVA (ethylene-vinyl acetate), grafted copolymers of ethylene with maleic anhydride (MAH), polyvinyl chloride (PVC), nylon-6, nylon-6,6, nylon-12, nylon-4, polypropylene and polypropylene copolymers, polyacrylates and polymethacrylates (PMMA), polycarbonate (PC), polybutylene terephthalates (PBT), polyethylene terephthalate (PET), fluorinated polymeric hydrocarbons, rubber, TPEs, block copolymers, TPU and polyurethanes, TPO, silicone polymers.

The present invention also provides the use of the inventive modified organophilic clay material as additive for a polymer composition, in particular as nanocomposite additive for a polymer composition.

The invention also encompasses pre-exfoliated nanocomposite additives which are obtainable by the inventive process.

The invention also provides a nanocomposite composition which is obtainable via incorporation of the inventive pre-exfoliated nanocomposite additive into a polymer composition.

The invention is explained in more detail below using examples, and also with reference to the attached figures.

The parameters mentioned in the examples were determined as follows:

Particle size distribution ($D_{50}$ value):

Grain size distribution was determined in the range from 0.05 to 900 μm by means of laser scattering in a Mastersizer S (Malvern Instruments GmbH).

A specimen of about 50 mg is treated with about 10 ml of ethanol in a 20 ml glass beaker and is treated for 5 minutes using an ultrasound probe. The suspension is transferred to the dispersing unit of the particle size analyzer and ethanol is added until the correct concentration of the specimen has been established in the test equipment. The measurement is carried out in accordance with the user manual. At the end of the measurement, the result is saved and printed out.

Bulk Density:

A specimen of the material dried in air is aerated via shaking in a closed vessel so as to remove all mechanically compacted portions within the specimen.

A 100 ml measuring cylinder, truncated at the 100 ml mark, is tared (m1) and then filled within a period of about 20 seconds with the aid of a powder funnel suspended in a holder. After 2 minutes a ruler is drawn across the surface to remove excess material. The weight (m2) of the full measuring cylinder is then determined with an accuracy of 0.01 g.

Bulk density (g/l)=(m2−m1)×10

Energy consumption: the electrical current consumption of the Henschel FM 200 heating mixer was determined.

EXAMPLES

Example 1 (Comparison)

100 g of a highly swellable, naturally occurring sodium bentonite are dispersed under high shear in water at a temperature of T=30° C. The solids concentration of the sodium bentonite in water is 3%. The temperature of the bentonite suspension is increased to 70° C., and a pre-dispersed mixture is added, composed of 90 mmol of distearyldimethylammonium chloride, 14 g of methyl ester of rapeseed oil (Kebonal® 20, Kebo), and 6.16 g of polydiethylsiloxane (Litsolvent® PL, Kebo).

Once the abovementioned mixture has been added to the sodium bentonite, the organophilic bentonite produced flocculates and is filtered and spray-dried. The bulk density of the resultant powder is 240 g/l.

The particle size distribution was measured on a specimen of the organophilic clay material. The values are given in Table 1.

TABLE 1

Particle size distribution of organophilic clay material from Example 1

| Size (μm) | Volume below, % |
|---|---|
| 0.060 | 0.00 |
| 0.070 | 0.00 |
| 0.080 | 0.00 |
| 0.090 | 0.00 |
| 0.100 | 0.00 |
| 0.200 | 0.07 |
| 0.300 | 0.31 |
| 0.400 | 0.61 |
| 0.500 | 0.90 |
| 0.600 | 1.17 |
| 0.700 | 1.44 |
| 0.800 | 1.73 |
| 0.900 | 2.08 |
| 1.00 | 2.48 |
| 2.0 | 9.38 |
| 3.00 | 20.19 |
| 4.00 | 32.22 |
| 5.00 | 43.73 |
| 7.0 | 63.23 |
| 10.00 | 82.58 |

TABLE 1-continued

Particle size distribution of organophilic clay material from Example 1

| Size (μm) | Volume below, % |
|---|---|
| 15.00 | 95.78 |
| 20.00 | 99.35 |
| 25.00 | 99.98 |
| 30.00 | 100.00 |
| 40.00 | 100.00 |
| 50.00 | 100.00 |
| 60.00 | 100.00 |
| 70.00 | 100.00 |
| 80.00 | 100.00 |
| 90.00 | 100.00 |
| 100.00 | 100.00 |
| 125.0 | 100.00 |
| 150.0 | 100.00 |
| 175.0 | 100.00 |
| 200.0 | 100.00 |
| 250.0 | 100.00 |

Figure 2:
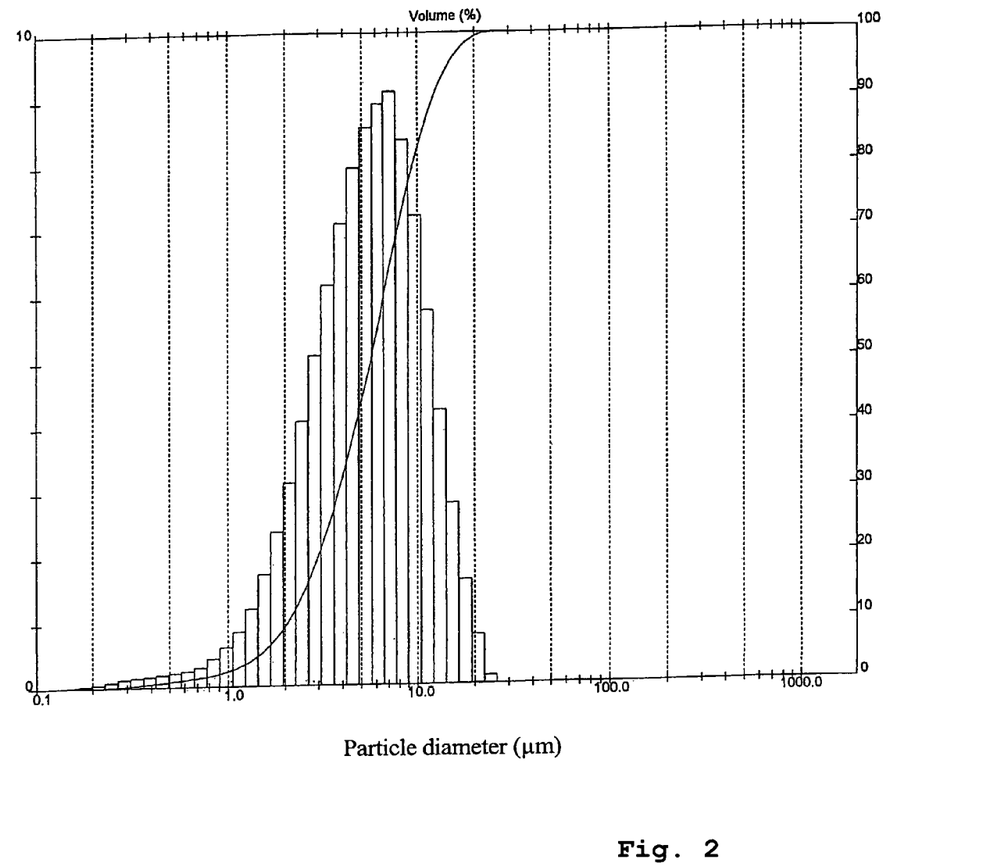
FIG. 2 shows: a graphical representation of a particle size distribution of a commercially available organophilic clay material (Nanofil® 5; Südchemie AG)

The particle size distribution is represented graphically in FIG. 2. The threshold values derived from this particle size distribution are given in Table 1a.

TABLE 1a

Threshold values for particle size distribution

| Threshold value | Size (μm) |
|---|---|
| $D_{10}$ | 2.07 |
| $D_{50}$ | 5.59 |
| $D_{90}$ | 12.06 |
| $D_{100}$ | 26.20 |

Example 2

100 kg of "Nanofil® 5" nanoclay from Süd-Chemie AG with bulk density of 240 g/l are used as initial charge in a Thyssen Henschel FM 200-KM 1000 heating-cooling mixer. Nanofil® 5 is a distearyldimethylammoniumchloride-modified bentonite. The rotation rate of the mixer is adjusted to 1360 rpm (revolutions per minute), and the system is heated to a temperature of 45° C. At this temperature, 10 kg of the methyl ester of rapeseed oil (Kebonal® 20, Kebo) and 4.4 kg of polyethylsiloxane (Litsolvent® PL, Kebo) are metered in the stated sequence as additive into the material over a period of about 30 s. In order to ensure homogeneous and thorough mixing, the additives are added directly into the vortex produced via the mixing element. At the stated rotation rate, the reaction mixture is heated to the discharge temperature of 80° C.

Figure 1:
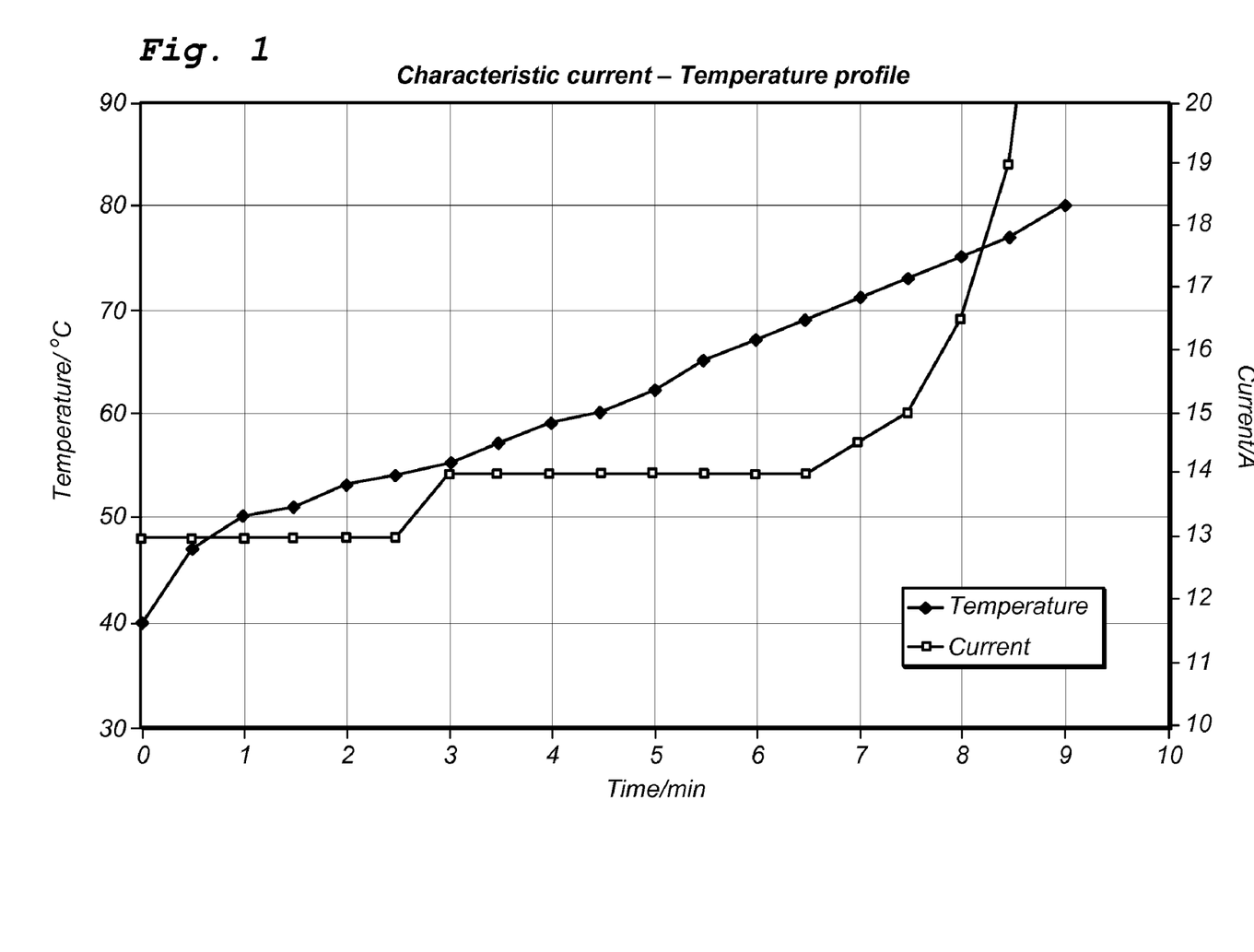
FIG. 1 shows: a graph which gives the temperature of the material in the mixer, and also the electrical current consumption of the mixing assembly, as a function of the mixing time.

The temperature profile during the mixing process can be found in FIG. 1, as also can the electrical current consumption profile for the mixture. It can be seen that while the temperature of the material in the mixer increases linearly under the selected conditions, significant electrical current consumption by the mixer is observed after about 7.5 minutes. In order to avoid complete agglomeration of the powder, and with this in turn eventually impaired dispersibility of the nanoclay in polymers, the mixing process is terminated at a temperature of 80° C. and after 7.5 minutes.

The product is an organophilic clay material surface-modified by the two additives and having a bulk density of 480 g/l. The modified organophilic clay material takes the form of a fine-particle powder with the particle size distribution given in Table 2. The particle size distribution is also given graphically in FIG. 3.

TABLE 2

Particle size distribution of modified organophilic clay material from Example 1

| Size (μm) | Volume below, % |
|---|---|
| 0.060 | 0.00 |
| 0.070 | 0.00 |
| 0.080 | 0.01 |
| 0.090 | 0.02 |
| 0.100 | 0.02 |
| 0.200 | 0.26 |
| 0.300 | 0.83 |
| 0.400 | 1.41 |
| 0.500 | 1.93 |
| 0.600 | 2.51 |
| 0.700 | 3.16 |
| 0.800 | 3.97 |
| 0.900 | 5.01 |
| 1.00 | 6.21 |
| 2.0 | 23.35 |
| 3.00 | 42.41 |
| 4.00 | 58.43 |
| 5.00 | 70.95 |
| 7.0 | 86.52 |
| 10.00 | 96.15 |
| 15.00 | 99.64 |
| 20.00 | 100.00 |
| 25.00 | 100.00 |
| 30.00 | 100.00 |
| 40.00 | 100.00 |
| 50.00 | 100.00 |
| 60.00 | 100.00 |
| 70.00 | 100.00 |
| 80.00 | 100.00 |
| 90.00 | 100.00 |
| 100.00 | 100.00 |
| 125.0 | 100.00 |
| 150.0 | 100.00 |
| 175.0 | 100.00 |
| 200.0 | 100.00 |
| 250.0 | 100.00 |

The threshold values determined from the particle size distribution are given in Table 2a.

TABLE 2a

Threshold values for particle size distribution

| Threshold value | Size (μm) |
|---|---|
| $D_{10}$ | 1.26 |
| $D_{50}$ | 3.45 |
| $D_{90}$ | 7.74 |
| $D_{100}$ | 19.31 |

Figure 3:
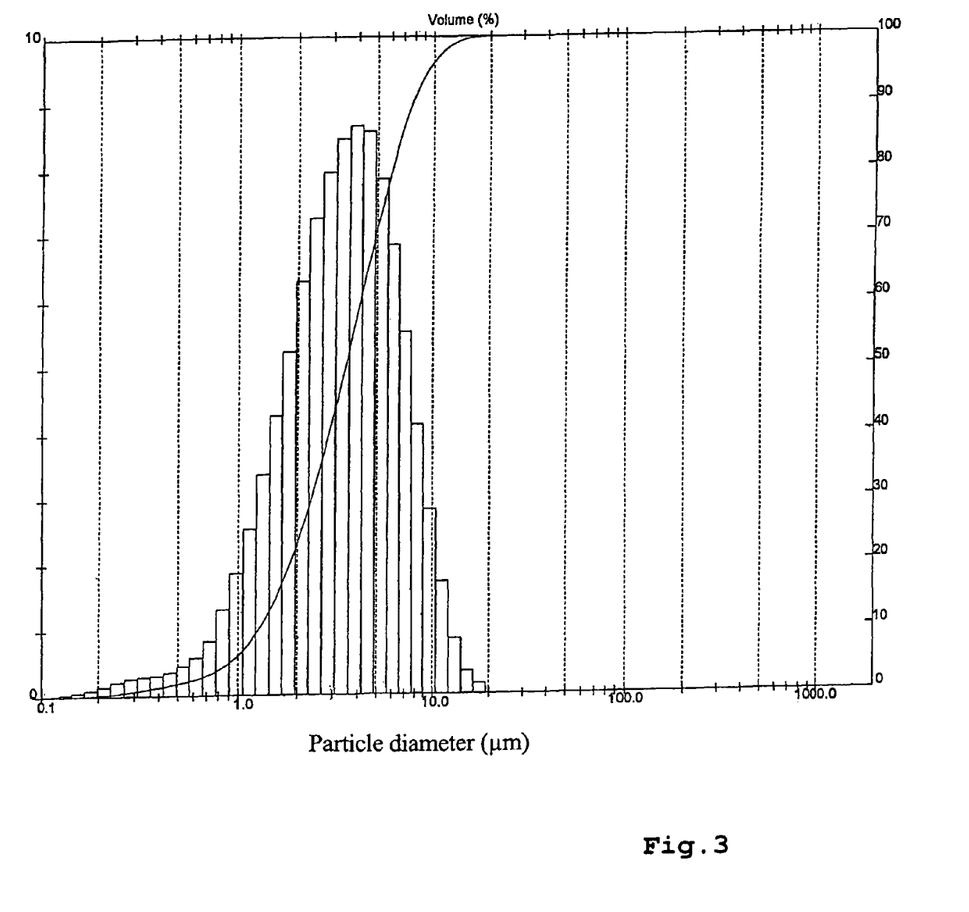
FIG. 3 shows: a graphical representation of a particle size distribution of an inventively modified organophilic clay material.

On continuation of the mixing procedure at temperatures above 80° C., agglomerates form with a markedly coarser particle size distribution than that represented in FIG. 3.

The surface-modified organophilic clay material is cooled at a low rotation rate to a temperature of from 20 to 40° C. For this, the modified organophilic clay material heated to 80° C. is transferred into a second mixer which encompasses a cooling apparatus, and in which the material in the mixer is cooled to a temperature of from 20 to 40° C.

The bulk density of the resultant powder is 480 g/l. During conduct of the experiment, specimens were taken at regular intervals and bulk density was determined. The results are given in Table 3.

TABLE 3

Alteration in bulk density during the modification process

| | Mixing time (min) | | | | | | | | |
|---|---|---|---|---|---|---|---|---|---|
| | 1 | 2 | 3 | 4 | 5 | 6 | 7 | 7.5 | 8 |
| Bulk density (g/l) | 240 | 242 | 242 | 267 | 280 | 301 | 344 | 480 | 560 |

Table 3 shows that the bulk density increases after about 4 minutes of mixing time, and that a significant rise in bulk density occurs after a mixing time of from 7 to 8 minutes. This corresponds to the period after which an increase in the electrical current consumption of the mixer is also observed.

Comparison of the particle size distribution of the inventively modified organophilic clay material (FIG. 3) with that of the organophilic clay material Nanophil® 5 used as starting material for the preparation process (FIG. 2) shows that the inventive dry-mixing process can achieve a finer particle size distribution.

The $D_{50}$ values for the organophilic clay materials obtained in Examples 1 and 2 are listed again in Table 4 for comparison.

TABLE 4

$D_{50}$ values for organophilic clay materials

| Nanofil ® (Example 1) | 5.6 μm |
|---|---|
| Example 2 | 3.4 μm |

The inventive surface modification (Example 2) therefore achieves the following advantages:
- increase of bulk density by 100%;
- reduction of particle size;
- improvement in mechanical properties of polypropylene, and this could be demonstrated via the following incorporation of the organophilic clay materials from Example 1 and Example 2.

Example 3, Compounding

The organophilic clay materials obtained from Example 1 and Example 2 are incorporated as follows by compounding into RB 307 MO (producer: Borealis), which is a blow-molding grade of polypropylene:

A ZE 25 (Berstorff) co rotating laboratory twin-screw extruder was used. Each of the components of the formulation was metered gravimetrically into the main hopper. The extrudates of compounded material discharged are cooled in a water bath and pelletized.

The extrusion process involves one step using a temperature profile of from 180° C. to 225° C. The screw rotation rate is 300 rpm. The throughput is 10 kg/h.

The resultant pellets were used to produce test specimens in an Ergotech 100/420-310 (Demag) injection molding machine. The resultant test specimens were used to determine modulus of elasticity ($E_t$) to ISO 527-2/1A/50 and notched impact resistance (Charpy) to ISO 179/1eU at 23° C. The values found are given in Table 5.

TABLE 5

Properties of test specimens

| | RB 307 Mo (%) | Additive (%) | Modulus of elasticity $E_t$ (GPa) | Notched impact resistance (kJ/m²) |
|---|---|---|---|---|
| Example 1 | 5 | — | 0.68 | 14.7 |
| Example 2 | — | 5 | 0.79 | 20.9 |

As can be seen from Table 5, improved properties in relation to modulus of elasticity and notched impact resistance are obtained with the additive from Example 2.

Example 3

Example 2 was repeated, but the mixing of the organophilic clay material with the additive was not carried out using a heating-cooling mixer, but using an Eirich intensive mixer with omission of the heat supply during the mixing procedure. The components Nanofil® 5 (1 kg), Kebonal 20 (100 g), and Lithosolvent PL (44 g) were used as initial charge in the mixing container. The container was placed in the mixer and fluidizer and rotating plates were set in motion.

| | |
|---|---|
| Container fill level: | about 80% |
| Fluidizer drive: | level 2 |
| Rotating plate drive: | level 2 |
| Bulk density of Nanofil ® 5: | 243 g/l |

During the mixing procedure, the temperature of the material in the mixer was regularly determined, as was the electrical current consumption of the mixer. Specimens were moreover taken at regular intervals and bulk density was determined. The values are given in Table 6.

TABLE 6

Process parameters using an intensive mixer

| Time min | Temperature ° C. | Electrical current consumption A | Bulk density g/l |
|---|---|---|---|
| 1 | 19.5 | 5.5 | 274 |
| 2 | 19.7 | 5.5 | 271 |
| 3 | 19.6 | 5.5 | 281 |
| 4 | 19.6 | 5.5 | 295 |
| 5 | 19.7 | 5.5 | 289 |
| 6 | 19.7 | 5.5 | 284 |
| 7 | 19.5 | 5.5 | 292 |
| 8 | 19.6 | 5.5 | 296 |
| 9 | 19.6 | 5.5 | 287 |
| 10 | 19.7 | 5.5 | 294 |

The particle size distribution of the starting material was also measured, as was that of the resultant product, and the $D_{50}$ value was determined. The results are given in Table 7.

TABLE 7

$D_{50}$ value on mixing in intensive mixer

| | |
|---|---|
| Starting material | 7.7 µm |
| Final product | 5.6 µm |

As can be seen from Table 6, the temperature of the material in the mixer does not increase during the mixing procedure. Nor was any increase in the electrical current consumption of the mixture observed during the mixing time. The bulk density of the modified organophilic clay material did not increase substantially.

What is claimed is:

1. A method of surface modification of an organophilic clay material, comprising:
   introducing a portion of a dry, pulverulent, organophilic clay material to a high-shear mixing assembly;
   introducing a portion of at least one additive for surface modification of the organophilic clay material to the high-shear mixing assembly; and
   intensively mixing the dry, pulverulent, organophilic clay material portion and the at least one additive portion in the high-shear mixing assembly such that an increase in a bulk density of the organophilic clay material of at least 20% is achieved, based on an initial bulk density of the dry, pulverulent, organophilic clay material used;
   wherein no water or solvent is added or used for introduction of the at least one additive portion to the high-shear mixing assembly, and wherein the at least one additive portion comprises siloxane components and at least one additive portion selected from the group consisting of fatty acids, fatty acid derivatives, non-ionic organic components with at least one aliphatic or cyclic radical having 6 to 32 carbon atoms, and mixtures thereof.

2. The method of claim 1, further comprising heating the dry, pulverulent, organophilic clay material portion and the additive portion in the high-shear mixing assembly, and wherein heating comprises controlling a temperature of the high-shear mixing assembly such that a temperature of the organophilic clay or a temperature of the at least one additive is raised during the intensive mixing.

3. The method of claim 1, wherein intensively mixing comprises controlling an amount of energy applied to the intensive mixing such that an increase in the amount of energy applied to the high-shear mixing assembly of at least 10% is achieved, measured on the basis of the electrical current consumption of the high-shear mixing assembly.

4. The method of claim 1, wherein, during intensively mixing, a median particle size distribution of particles of the dry, pulverulent, organophilic clay material portion increases by not more than 10% with respect to an initial median particle size distribution of particles of the dry, pulverulent organophilic clay material portion, wherein particle size is measured as $D_{50}$.

5. The method of claim 1, wherein, prior to intensively mixing, the median particle size distribution of the particles of the dry, pulverulent, organophilic clay material portion is below 50 µm, wherein particle size is measured as $D_{50}$.

6. The method of claim 1, wherein, prior to intensively mixing, the bulk density of the dry, pulverulent, organophilic clay material portion is less than 300 g/l.

7. The method of claim 1, wherein the siloxane component comprises oligomeric siloxanes, polymeric siloxanes, polydialkyl siloxanes, polydialkylaryl siloxanes, polydiaryl siloxanes, or mixtures thereof.

8. The method of claim 1, wherein the fatty acid derivative is selected from a group consisting of hydrogenated fatty acids, polymeric fatty acids, keto fatty acids, fatty acid alkyloxazolines, fatty acid alkyl bisoxazolines, or mixtures thereof; and unsaturated fatty acids.

9. A method of surface modification of an organophilic clay material, comprising:

introducing a portion of a dry, pulverulent, organophilic clay material to a high-shear mixing assembly;

introducing a portion of at least one additive for modification of the organophilic clay material to the high-shear mixing assembly; and high-shear mixing the dry, pulverulent, organophilic clay material portion and the portion of the at least one additive in the high-shear mixing assembly; and forming a surface modified, powdered, organophilic clay material;

wherein no water or solvent is added or used for introduction of the at least one additive portion to the high-shear mixing assembly, and wherein the at least one additive portion comprises fatty acids, fatty acid derivatives, non-ionic organic components with at least one aliphatic or cyclic radical having 6 to 32 carbon atoms, or mixtures thereof wherein the high-shear mixing of the dry, powdered, organophilic clay material portion and at least one additive portion in the high-shear mixing assembly comprises controlling an amount of energy applied to the high-shear mixing assembly such that the electrical current consumption of the high-shear mixing assembly increases measured on the basis of the electrical current consumption of the high-shear mixing assembly.

10. The method of claim 9, wherein high-shear mixing causes fluidization of the portion of the dry, pulverulent, organophilic clay material and the portion of the at least one additive.

11. The method of claim 9, wherein the organophilic clay material comprises phyllosilicate clay modified with a quaternary ammonium salt.

12. The method of claim 9, wherein, during the high-shear mixing, the dry, powdered, organophilic clay material portion remains in the form of a powder.

13. The method of claim 9, further comprising heating the dry, pulverulent, organophilic clay material portion and the additive portion in the high-shear mixing assembly, and wherein heating comprises controlling an amount of energy introduced from the high-shear mixing assembly such that a temperature of the organophilic clay or a temperature of the at least one additive is raised during the intensive mixing.

14. The method of claim 9, wherein during high-shear mixing a median particle size distribution of particles of the dry, pulverulent, organophilic clay material portion does not increase with respect to an initial median particle size distribution of particles of the dry, pulverulent organophilic clay material portion, wherein particle size is measured as $D_{50}$.

15. The method of claim 9, wherein, prior to the high-shear mixing, the median particle size distribution of the particles of the dry, pulverulent, organophilic clay material portion is below 50 µm, wherein particle size is measured as $D_{50}$.

16. The method of claim 9, wherein, prior to the high-shear mixing, the bulk density of the dry, pulverulent, organophilic clay material portion is less than 300 g/l.

17. The method of claim 9, wherein at least one additive portion further comprises a siloxane component, wherein the siloxane component comprises oligomeric siloxanes, polymeric siloxanes, polydialkyl siloxanes, polydialkylaryl siloxanes, polydiaryl siloxanes, or mixtures thereof.

18. The method of claim 9, wherein high-shear mixing comprises shearing the organophilic clay material portion such that at least one new surface on the organophilic clay material portion is created.

19. The method of claim 9, wherein high-shear mixing comprises shearing the organophilic clay material portion such that at least one new surface on the organophilic clay material is created, and wherein the additive coats at least a portion of the at least one new surface.

20. The method of claim 9, wherein the clay material has a water or solvent content of less than 10% by weight.

21. The method of claim 9, wherein, during high-shear mixing, an increase in a bulk density of the organophilic clay material of at least 20% is achieved, based on an initial bulk density of the dry, powdered, organophilic clay material used.

22. The method of claim 9, wherein the at least one additive further comprises siloxanes components.

23. A method of surface modification of an organophilic clay material, comprising:

introducing a portion of a dry, powdered, organophilic clay material to a high-shear mixing assembly;

introducing a portion of at least one additive for modification of the organophilic clay material to the high-shear mixing assembly;

intensively mixing the dry, powdered, organophilic clay and the at least one additive in the high-shear mixing assembly such that electrical current consumption of the high-shear mixing assembly increases as compared to an initial, substantially constant, electrical current consumption of the high shear mixing assembly; and forming a surface modified, powdered, organophilic clay material;

wherein no water or solvent is added or used for introduction of the at least one additive to the high-shear mixing assembly, and wherein the at least one additive comprises fatty acids, fatty acid derivatives, non-ionic organic components with at least one aliphatic or cyclic radical having 6 to 32 carbon atoms, or siloxane components.

24. The method of claim 23, wherein the increase in electrical current consumption is non-linear.

25. The method of claim 23, further comprising heating the dry, powdered, organophilic clay and the at least one additive in the high-shear mixing assembly.

26. The method of claim 23, further comprising controlling a temperature of the high-shear mixing assembly such that the at least one additive melts, and in that, if more than one additive is present, a temperature sufficient to melt the highest-melting-point additive is obtained.

27. The method of claim 23, further comprising controlling a temperature of the high-shear mixing assembly such that a temperature of the organophilic clay or a temperature of the at least one additive is raised.

28. The method of claim 23, wherein intensively mixing comprises controlling an amount of energy introduced from the high-shear mixing assembly such that a temperature of the organophilic clay or a temperature of the at least one additive is raised.

29. The method of claim 23, wherein, during intensively mixing, an increase in a bulk density of the organophilic clay material of at least 20% is achieved, based on an initial bulk density of the dry, powdered, organophilic clay material used.

30. The method of claim 23, further comprising forming a mixture from the intensive mixing, and cooling the mixture immediately after intensively mixing.

31. The method of claim 23, wherein the organophilic clay material portion comprises phyllosilicate clay modified with a quaternary ammonium salt.

32. The method of claim 23, wherein the non-ionic organic component with at least one aliphatic or cyclic radical has from 8 to 22 carbon atoms.

33. The method of claim 23, wherein the fatty acid derivative is a derivative of a compound selected from the group consisting of hydrogenated fatty acids, fatty alcohols, saturated fatty alcohols, unsaturated fatty alcohols, fatty aldehydes, fatty ketones, fatty alcohol polyglycol ethers, fatty amines, glyceride esters, diglyceride esters, triglyceride esters, fatty acid alkanolamides, fatty acid amide, alkyl esters of fatty acids, fatty acid glucamide, dicarboxylic esters, waxes, and water-insoluble fatty acid soaps.

34. The method of claim 23, wherein the non-ionic organic component is selected from the group consisting of fatty alcohols, fatty amides, triglyceride esters, alkyl esters of fatty acid, and waxes.

35. The method of claim 23, wherein, during intensively mixing, at least one new surface on the dry, powdered, organophilic clay material portion is created.

36. The method of claim 23, wherein, during intensively mixing, at least one new surface on the dry, powdered, organophilic clay material portion is created, and wherein at least some of the at least one additive portion coats at least a portion of the new surface on the organophilic clay material.

37. The method of claim 23, wherein, during intensively mixing, a surface of the dry, powdered, organophilic clay material portion is modified by the at least one additive portion.

38. The method of claim 23, further comprising cooling the dry, powdered, organophilic clay and the at least one additive in the high-shear mixing assembly.

39. The method of claim 23, further comprising cooling the dry, powdered, organophilic clay and the at least one additive in the high-shear mixing assembly after the increase in electrical consumption.

40. The method of claim 23, wherein the non-ionic organic component comprises Montan waxes, paraffins, and PE waxes, or mixtures thereof.

* * * * *